United States Patent [19]

Watkins

[11] Patent Number: 5,013,272
[45] Date of Patent: May 7, 1991

[54] RAFTING CUSHION

[75] Inventor: Richard Watkins, Gloversville, N.Y.

[73] Assignee: N.A. Taylor Company, Inc., Gloversville, N.Y.

[21] Appl. No.: 403,454

[22] Filed: Sep. 6, 1989

[51] Int. Cl.⁵ .............................................. B63C 9/30
[52] U.S. Cl. ................................... 441/127; 114/219
[58] Field of Search ........................... 114/219, 220; 441/125–127, 134; 14/76; 405/211–215; 293/109; D12/167–168; 267/139, 140

[56] References Cited

U.S. PATENT DOCUMENTS

| | | |
|---|---|---|
| 24,038 | 2/1895 | Kuhn . |
| D. 235,986 | 7/1975 | Nielsen ........................... D12/168 |
| D. 306,245 | 2/1990 | Akhtarekhavari ................ D6/601 |
| 3,026,548 | 3/1962 | Dollinger ........................ 441/125 |
| 3,433,200 | 3/1969 | Compte .......................... 114/219 |
| 3,540,403 | 11/1970 | Russell ........................... 405/212 |
| 4,198,919 | 4/1980 | Evans et al. .................... 114/219 |
| 4,565,147 | 1/1986 | Bortolotti ....................... 114/219 |
| 4,664,053 | 5/1987 | Mesinger ....................... 114/219 |
| 4,773,349 | 9/1988 | McKinney ...................... 114/219 |

OTHER PUBLICATIONS

Larsen Marketing, Inc. Brochure Entitled, "Multi-Purpose-Fender".
Nelson A. Taylor Co., Inc. 1989 Catalog (printed 1988), pp. 1 through 10.

Primary Examiner—Jesus D. Sotelo
Attorney, Agent, or Firm—Nixon & Vanderhye

[57] ABSTRACT

A boat fender, or cushion, of flexible plastic (e.g. PVC) is particularly designed to fit on a boat gunwale to allow boats to be safely connected together for "rafting". An elongated integral hollow body of flexible plastic comprises a pair of generally cylindrical portions and a central portion connecting the cylindrical portions. Through-extending closed periphery open end openings pass concentrically through the cylindrical portions, and other sets of openings pass through the central portion perpendicular to the cylindrical portions. Lines (ropes) may be passed through the openings to lash the cushion to a boat (e.g. at a boat gunwale), dock, piling, pier, or the like. Reinforcing tubes extend in the hollow interior of the body at the openings, and the body may be inflatable. The device also may be used as a seat cushion.

25 Claims, 2 Drawing Sheets

RAFTING CUSHION

BACKGROUND AND SUMMARY OF THE INVENTION

One of the most widely used boating accessories is commonly known as a boat fender. Typical fenders are made of flexible PVC, and are hollow and inflatable, and are used to protect a boat from a dock, another boat, or various other structures that a boat may encounter when moored. Some fenders are lashed to the boat or other structure by lines (ropes) tied through openings in end ear flaps, while others have a single central through-extending passageway through which the line may pass.

While commercially available fenders, such as those sold by the Nelson A. Taylor Co., Inc. of Gloversville, N.Y., are extremely versatile, there are some circumstances in which they function somewhat less than ideally. For example, under some circumstances, it is desirable to tie or moor two boats together, for "rafting". Under such circumstances, conventional fenders sometimes do not provide ideal protection. Also, it is sometimes difficult to lash conventional fenders to stationary objects, such as docks, piers, or pilings.

According to the present invention, a boat fender is provided which is ideally suited for "rafting", and also is versatile so that is may be readily tied to a piling or the like.

According to one embodiment, the boat fender (or "rafting cushion") according to the invention comprises an elongated body of flexible plastic (e.g. PVC). The body preferably comprises a first generally cylindrical section elongated in the dimension of elongation of the body, and a second generally cylindrical section. The sections preferably have the same diameter, but may have different diameters. A central (non-cylindrical) section, having a width less than the cross-sectional dimensions of the cylindrical sections, connects them. Means are provided for facilitating attachment of the body to an object (e.g. boat gunwale, dock, etc.); these means preferably comprise means defining a plurality of through-extending passages in the body to allow the body to be lashed to an object, the passages being dimensioned to receive a line (rope) therein. Ribs may be provided on the outside of the structure for ornamentation, and to provide surface texture.

Preferably the passages are defined by reinforcing tubes disposed interiorly of the body. The body typically is hollow, and may be inflatable. Two of the passages extend concentrically with the cylindrical sections. The passages also preferably comprise three sets of passages through the central section which are generally perpendicular to the dimension of elongation of the body. The central section includes first and second faces; preferably the first face is essentially a tangent from the cylindrical sections, while the second face is recessed to receive a protruding part of a structure to which the fender is to be lashed; however both faces may be recessed.

According to another respect of the present invention, a boat fender is provided comprising an elongated integral body of flexible material (e.g. plastic), with means defining at least one first through-extending passageway generally parallel to the dimension of elongation of the body, and means defining at least one second through-extending passage generally perpendicular to the dimension of elongation. The passage defining means preferably comprise reinforcing tubes. Typically the body is hollow, and may be inflatable, and the reinforcing tubes are disposed therein.

According to yet another aspect of the present invention, in combination with a boat having a gunwale, a rafting cushion is provided. The rafting cushion comprises an elongated body of flexible plastic comprising a pair of generally cylindrical portions elongated in a dimension of elongation of the body, and a central portion interconnecting the cylindrical portions and having first and second side faces. The second side face is recessed to receive the boat gunwale therein. Means define through-extending openings in the body to receive lines for lashing the body in place with the recess receiving the gunwale of the boat.

It is the primary object of the present invention to provide a simple, effective, and versatile boat fender, particularly one that may be readily lashed to a boat gunwale, or to stationary structure. This and other objects of the invention will become clear from an inspection of the detailed description of the invention and from the appended claims.

DETAILED DESCRIPTION OF THE DRAWINGS

Figure 1:
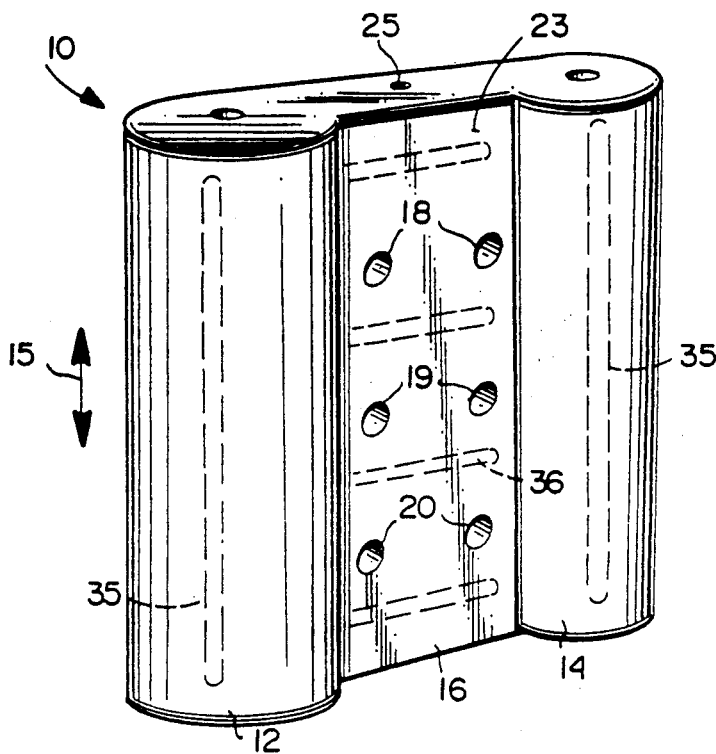
FIG. 1 is a rear perspective view of an exemplary boat fender according to the invention.

A boat fender according to the invention is shown generally by reference numeral 10 in the drawings. The fender comprises an integral body of flexible material. Preferably the body is of flexible PVC plastic, and is formed by rotational molding, as are conventional boat fenders. However, a number of separate elements could be molded, glued, strapped, or otherwise attached together to form the integral body.

Figure 3:
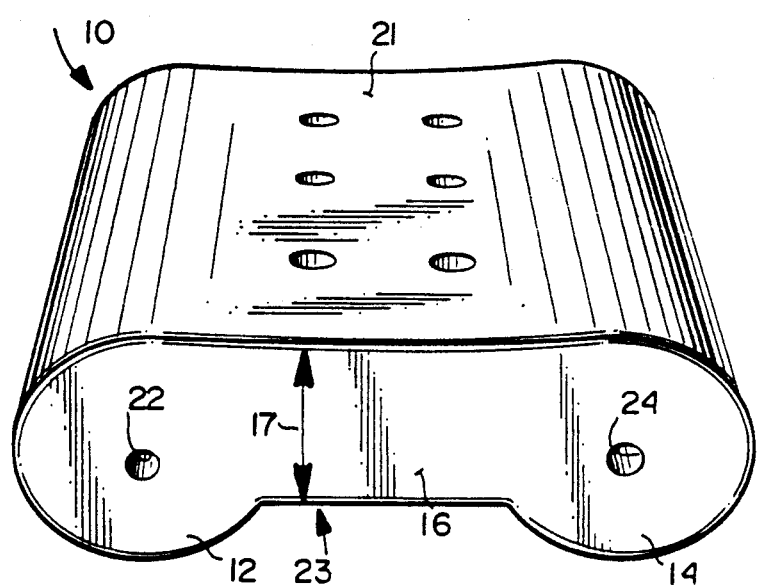
FIG. 3 is a top perspective view of the fender of FIG. 1.

The fender 10 according to the invention comprises first and second generally cylindrical sections 12, 14. They may be circular in cross-section, or may be parallelepipeds (polygonal in cross-section), the term "generally cylindrical" encompassing all such structures. The sections 12, 14 are elongated in the same dimension of elongation as the fender 10 (e.g. dimension 15 in FIG. 1). A central section 16 interconnects the cylindrical sections 12, 14. Preferably the sections 12, 14 have approximately the same cross-sectional dimension (e.g. diameter), but the dimensions may be different and the width 17 (see FIG. 3) of the central section 16 is less than the cross-sectional dimension (e.g. diameter) of the cylindrical sections 12, 14.

Means are provided for facilitating attachment of said body to an object (e.g. gunwale, dock, etc.). While straps, surface contours for receiving straps, clamps formed with the body, or the like could be used, such body attachment facilitating means preferably comprise means defining a plurality of through-extending, closed periphery, open end passages in the fender 10. These passages preferably comprise a plurality (e.g. three) of pairs of passages 18, 19, and 20 (see FIG. 1 in particular) which extend through the central section 16 generally perpendicular to the dimension of elongation 15. They have open ends and a closed periphery, and are dimensioned to receive a line (rope) therein.

The passage defining means also comprises means defining open end, closed periphery passages 22, 24 which are preferably concentric with the cylindrical portions 12, 14, and therefore of course parallel to the dimension of elongation 15. The passages 22, 24 also are dimensioned to receive a line therein.

The central section has a first face 21, and a second face 23. The first face 21 preferably is essentially a continuation of the cylindrical portions 12, 14—i.e. it is tangent to the cylindrical portions 12, 14. The face 23, on the other hand, is recessed, so as to receive a protruding portion of a structure to which the fender 10 is to be lashed. For example the recess 23 may receive gunwale of a boat, a dock, a piling, or the like.

Preferably the fender body 10 is hollow, and it may be inflatable. Inflation may be accomplished utilizing a conventional valve 25 (FIG. 1). The valve may be a conventional valve such as utilized with inflatable balls (such as basketballs, footballs, and the like), utilizing a needle and a hand pump. Alternatively, the valve may be a combination ball-type needle receiving valve, with a screw-in portion to allow a foot pump to inflate the fender 10. Such a valve is known by the trademark "BIVALVE", and is sold by Nelson A. Taylor Co., Inc. in many of its conventional inflatable vinyl fenders.

Figure 2:
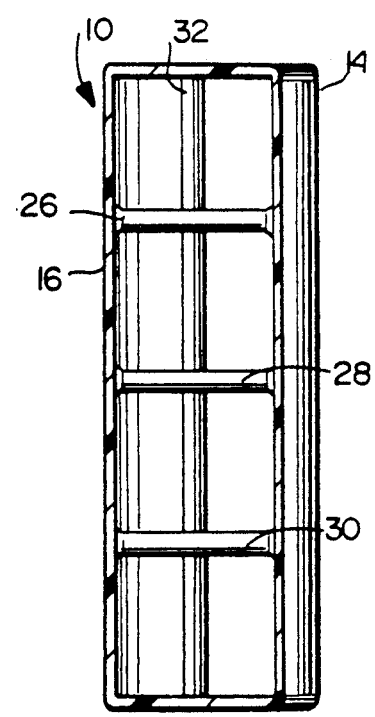
FIG. 2 is a longitudinal cross-sectional view taken at the center section, adjacent the through-extending passages, of the fender of FIG. 1.

Also according to the present invention, the passageway defining means preferably comprise internal tubes defining the passage 18 through 20, 22, and 24. For example as seen in FIG. 2, internal tubes 26 define the passages 18, tube 28 define the passages 19, tubes 30 define the passages 20, and tube 32 defines the passsage 24 (a similar internal tube defines the passage 22, but cannot be seen in FIG. 2). The internal tubes 26, 28, 30, 32 provide for reinforcement of the fender in two directions, making it sturdy and less susceptible to crushing, and prevents the fender from "pillowing" if over-inflated. The tubes are also of PVC (e.g. PVC pipe). The tubes 30, 32 are insert molded at the same time the rest of the fender is rotationally molded.

Various surfaces of the fender 10 may optionally be provided with ribs, such as shown in dotted line at 35 and 36 in FIG. 1, at desired portions therearound. The ribs 35, 36 perform an ornamental function, and additionally provide surface texture to the surfaces of the fender 10 on which they are disposed.

Figure 4:
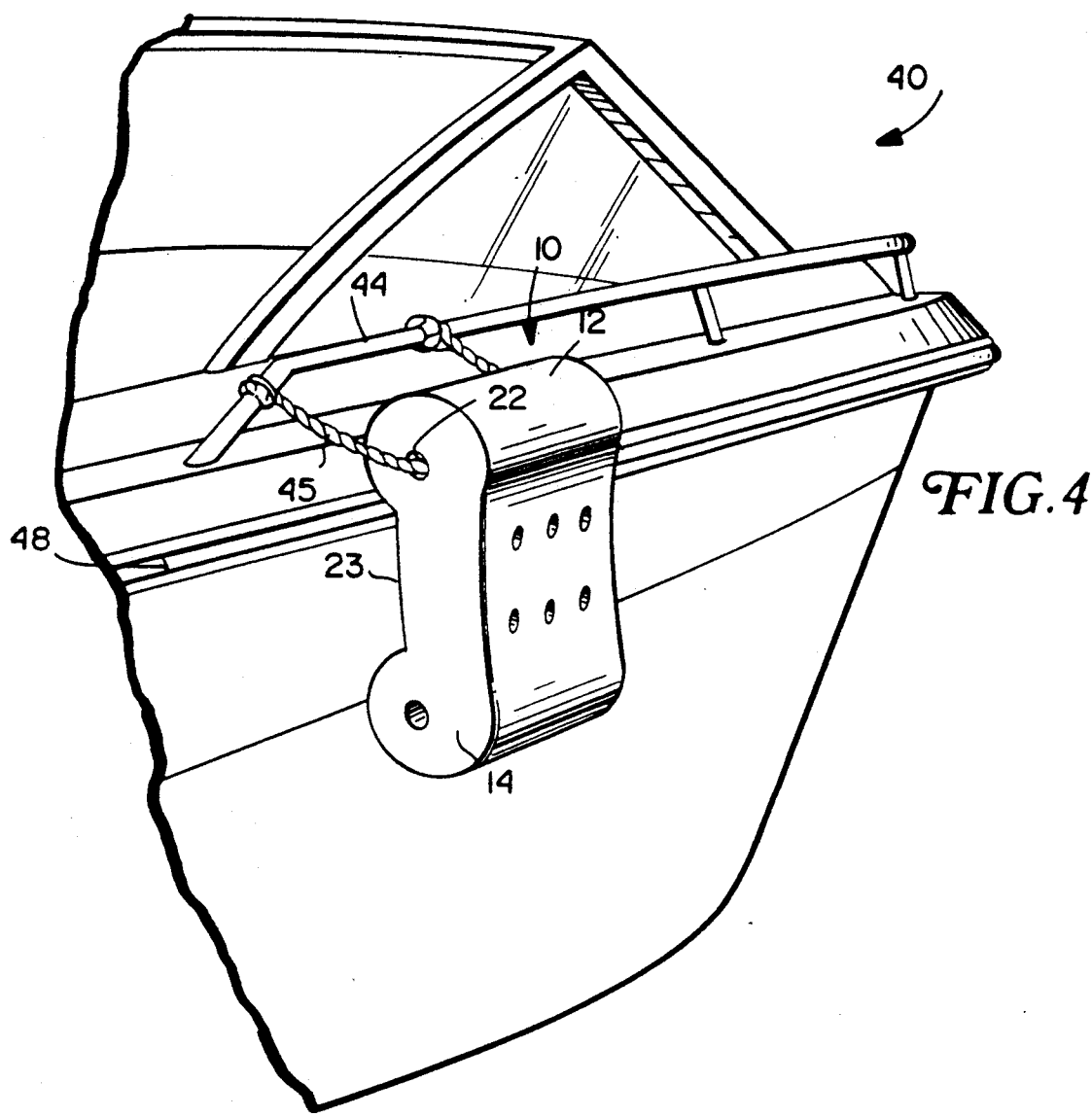
FIG. 4 schematically illustrates the fender of FIG. 1 in use in association with a boat gunwale.

Each of the passsages 18 through 20, 22, and 24 is large enough to receive and completely encircle a conventional line (rope) therein. Thus the passsageways serve not only as part of the reinforcing internal tubes, but provide a mechanism for lashing the fender body 10 to a structure. In FIG. 4, one of the best uses of the fender 10 is shown in association with a boat 40. The boat 40 has a railing 44, and a line 45 is used to lash the body 10 to the railing 44, with the recess 23 of the body 10 receiving the gunwale 48 of the boat 40. The line 45 passes through the opening 22 in the cylindrical portion 12. While the structure is shown with one line 45 extending through the opening 22, it is to be understood that in some circumstances lines can extend through more than one of the openings 18-20, 22, 24 of the fender 10, and/or line like 45 can be lashed to different railings, cleats, or other supporting structures.

Figure 5:
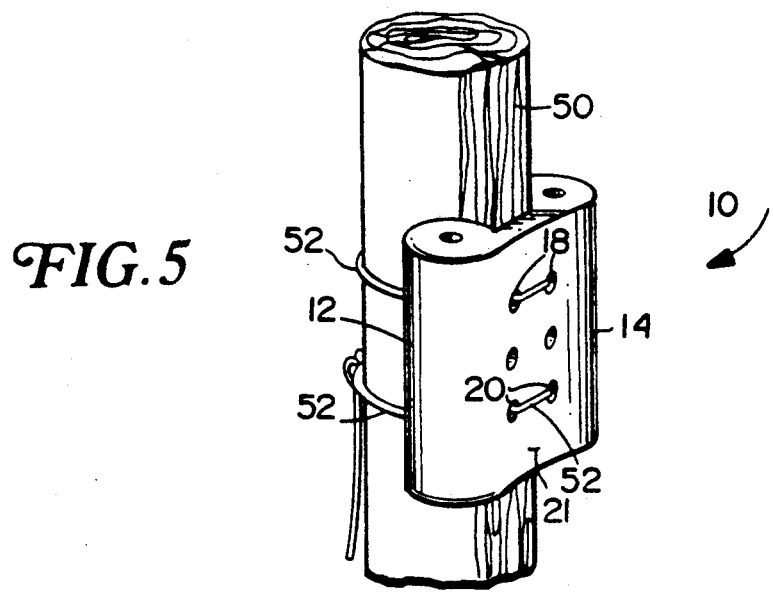
FIG. 5 is a schematic perspective view of the fender of FIG. 1 shown in use lashed to a piling.

In FIG. 5, the fender 10 is shown readily lashed to a piling 50. A line or lines 52 pass through one or more sets of openings 18 through 20 (i.e. openings 18 and 20 in FIG. 5), and are wrapped around the piling 50 and tied in place with a suitable knot. The first side face 21 of the fender 10 faces outwardly, while the recess 23 receives the piling 50 therein.

In addition to the specific uses described above, the fender 10 according to the invention has many other uses. For example it can be tied to a dock, can be disposed between a boat and a dock, and even can be used as a seat cushion having a configuration which provides for comfortable seating.

It will thus be seen that according to the present invention a boat fender or "rafting cushion" is provided which is strong, versatile, and ideally suited for "rafting" or for attachment to a dock, piling, pier or the like, or can be used as a seat cushion. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and combinations.

What is claimed is:

1. A boat fender comprising:
    an elongated integral body of flexible material, enlongated in a dimension of elongation, and comprising:
    a first generally cylindrical section having a first cross-sectional dimension;
    a second generally cylindrical section having a second cross-sectional dimension;
    a central section interconnecting said first and second cylindrical sections, and having a width less than the cross-sectional dimensions of either of said generally cylindrical sections; and
    means for facilitating attachment of said body to an object, comprising means for defining at least one through-extending closed periphery open end first passage through at least one of said generally cylindrical sections generally parallel to the dimension of elongation and means defining at least one through-extending closed periphery open end second passsage through said central section generally perpendicular to the dimension of elongation.

2. A fender as recited in claim 1 wherein said means defining at least one through-extending passsage defines a plurality of passsages, at least one in each generally cylindrical section and at least one in said central section; said means further comprising reinforcing tubes disposed interiorly of said body.

3. A fender as recited in claim 1 wherein said body is generally hollow.

4. A fender as recited in claim 3 wherein said body is inflatable.

5. A fender as recited in claim 1 wherein said body is made of flexible PVC.

6. A fender as recited in claim 1 wherein said means for facilitating attachmend of said body to an object further comprises a reinforcing tube associated with each passage disposed interiorly of said body.

7. A fender as recited in claim 1 wherein said central section comprises first and second faces, said second face recessed to receive a protruding part of a structure to which said fender is to be attached.

8. A boat fender comprising:

an elongated integral body of flexible material;

means defining a plurality of spaced first through-extending closed periphery open end passageways in said body, generally parallel to the dimension of elongation;

means defining a plurality of spaced second through-extending closed periphery open end passageways in said body, generally perpendicular to said dimension of elongation, and including reinforcing tubes; and said passageways being large enough to receive a line therein.

9. A boat fender as recited in claim 8 wherein said means defining said first passageways defines a pair of spaced passages.

10. A fender as recited in claim 8 wherein said means defining said second passageways defines a plurality of cooperating pairs of passages.

11. A boat fender as recited in claim 8 wherein said body is substantially hollow.

12. A boat fender as recited in claim 8 wherein said body is inflatable.

13. A body fender as recited in claim 8 wherein said body flexible material is of flexible PVC.

14. A boat fender as recited in claim 8 wherein said body comprises first and second faces generally parallel to said dimension of elongation, said second face recessed to receive a protruding portion of a structure to which said fender is to be lashed.

15. In combination with a boat having a gunwale, a rafting cushion said cushion comprising:

an integral body, elongated in a dimension of elongation, of flexible material, comprising: a pair of generally cylindrical portions elongated in said direction of elongation; a central portion interconnecting said cylindrical portions, and having first and second side faces; said second side face being recessed to recieve said boat gunwale therein; and means defining a plurality of closed periphery, open end passages in said cylindrical portions; said passages in said generally cylindrical portions, generally parallel to the dimension of elongation of said body, to receive a line therethrough for lashing said cushion onto the boat with said recess receiving said gunwale.

16. A combination as recited in claim 15 wherein said cushion is inflatable.

17. A combination as recited in claim 15 wherein said means defining through-extending passages in said cylindrical portions comprise internal reinforcing tubes.

18. A combination as recited in claim 15 wherein said cushion is generally hollow.

19. A combination as recited in claim 15 further comprising means defining a plurality of through-extending closed periphery open end passsages in said central connecting portion, generally perpendicular to said dimension of elongation.

20. A combination as recited in claim 19 wherein said means defining through-extending passages in said cylindrical portions comprise internal reinforcing tubes.

21. A boat fender comprising:

an elongated integral body fo flexible material, elongated in a dimension of elongation, and comprising:

a first generally cylindrical section having a first cross-sectional dimension;

a second generally cylindrical section having a second cross-sectional dimension;

a central section interconnecting said first and second cylindrical sections, and having a width less than the cross-sectional dimensions of either of said generally cylindrical sections; and means for facilitating attachment of said body to an object comprising means defining a plurality of through-extending passages, including a passage in each of said cylindrical sections concentric with said cylindrical section, and a plurality of passages in said central section, extending generally perpendicular to the dimension of elongation.

22. A fender as recited in claim 21 wherein said means defining through-extending passages further comprise reinforcing tubes disposed interiorly of said body.

23. A boat fender comprising:

an elongated integral body of flexible material, elongated in a dimension of elongation, and comprising:

a first hollow generally cylindrical section having a first cross-sectional dimension;

a second hollow generally cylindrical section having a second cross-sectional dimension;

a hollow central section interconnecting said first and second cylindrical sections, and having a width less than the cross-sectional dimensions of either of said generally cylindrical sections; and means for facilitating attachment of said body to an object, comprising means defining at least one through-extending passage in one of said hollow sections; and a solid-wall reinforcing tube associated with each passsage disposed interiorly of said hollow body section.

24. A boat fender comprising:

an elongated substantially hollow integral body of flexible material;

means defining at least one first through-extending closed periphery open end passageway in said body, generally parallel to the dimension of elongation;

means defining at least one second through-extending closed periphery open end passageways in said body, generally perpendicular to said dimension of elongation; and said passageways being large enough to receive a line therein.

25. A boat fender comprising:

an integral body of flexible material elongated in a dimension of elongation;

said body comprising first and second faces generally parallel to said dimension of elongation, said second face recessed to receive a protruding portion of a structure to which said fender is to be lashed;

means defining at least one first through-extending closed periphery open end passsageway in said body, generally parallel to the dimension of elongation;

means defining at least one second through-extending closed periphery open end passsageway in said body, generally perpendicular to said dimension of elongation; and said passageways being large enough to receive a line therein.

* * * * *

UNITED STATES PATENT AND TRADEMARK OFFICE
CERTIFICATE OF CORRECTION

PATENT NO. : 5,013,272

DATED : May 7, 1991

INVENTOR(S) : Watkins et al

It is certified that error appears in the above-identified patent and that said Letters Patent is hereby corrected as shown below:

On title page item

[75] Inventors: Richard Watkins; Keith J. Duffy; Ira S. Morris, all of Gloversville, N.Y.

Signed and Sealed this

Nineteenth Day of January, 1993

*Attest:*

DOUGLAS B. COMER

*Attesting Officer*     *Acting Commissioner of Patents and Trademarks*